(12) United States Patent
Conte

(10) Patent No.: US 6,276,752 B1
(45) Date of Patent: Aug. 21, 2001

(54) PROTECTIVE CONTAINER FOR MOTOR VEHICLE SEATING

(76) Inventor: John C. Conte, 918 Lafayette Ave., Prospect Park, PA (US) 19076

( * ) Notice: Subject to any disclaimer, the term of this patent is extended or adjusted under 35 U.S.C. 154(b) by 0 days.

(21) Appl. No.: 09/577,641

(22) Filed: May 24, 2000

Related U.S. Application Data

(60) Provisional application No. 60/135,984, filed on May 25, 1999.

(51) Int. Cl.[7] ...................................................... B60N 2/28
(52) U.S. Cl. .................. 297/182; 297/188.2; 297/250.1; 297/256.16
(58) Field of Search ............................. 297/188.2, 250.1, 297/256.16, 411.24, 182

(56) References Cited

U.S. PATENT DOCUMENTS

| | | |
|---|---|---|
| 2,359,599 | 10/1944 | Allen . |
| 2,938,574 | 5/1960 | Brown . |
| 3,083,998 * | 4/1963 | Morris ......................... 297/411.24 X |
| 3,298,736 | 1/1967 | Decker . |
| 3,579,673 * | 5/1971 | Hirschey ....................... 297/250.1 X |
| 4,583,253 * | 4/1986 | Hall ............................... 297/250.1 X |
| 4,681,368 * | 7/1987 | Health et al. ................ 297/256.16 X |
| 4,729,600 * | 3/1988 | Single, II et al. ........... 297/256.16 X |
| 5,330,250 | 7/1994 | Reyes . |
| 5,549,353 | 8/1996 | Gaudet et al. . |
| 5,716,095 | 2/1998 | Lopez . |
| 5,820,215 * | 10/1998 | Dreisbach ....................... 297/256.16 |
| 6,000,753 | 12/1999 | Cone, II ........................... 297/256.16 |

FOREIGN PATENT DOCUMENTS 1294206  1/1992  (CA) .

\* cited by examiner

*Primary Examiner*—Peter R. Brown
(74) *Attorney, Agent, or Firm*—Volpe & Koenig, P.C.

(57) ABSTRACT

A protective container for motor vehicle seating which is adapted to hold a child safety seat is provided. The protective container includes a bottom panel having upper and lower faces and peripheral edges, as well as front, back and lateral sidewalls extending upwardly from each of the peripheral edges to define an enclosed, liquid-proof space surrounding a child safety seat receiving location on the upper face. The enclosed, liquid-proof space is adapted to contain liquids and other debris to protect at least a horizontal surface of the motor vehicle seating. Padding is located on the lower face of the bottom panel.

16 Claims, 3 Drawing Sheets

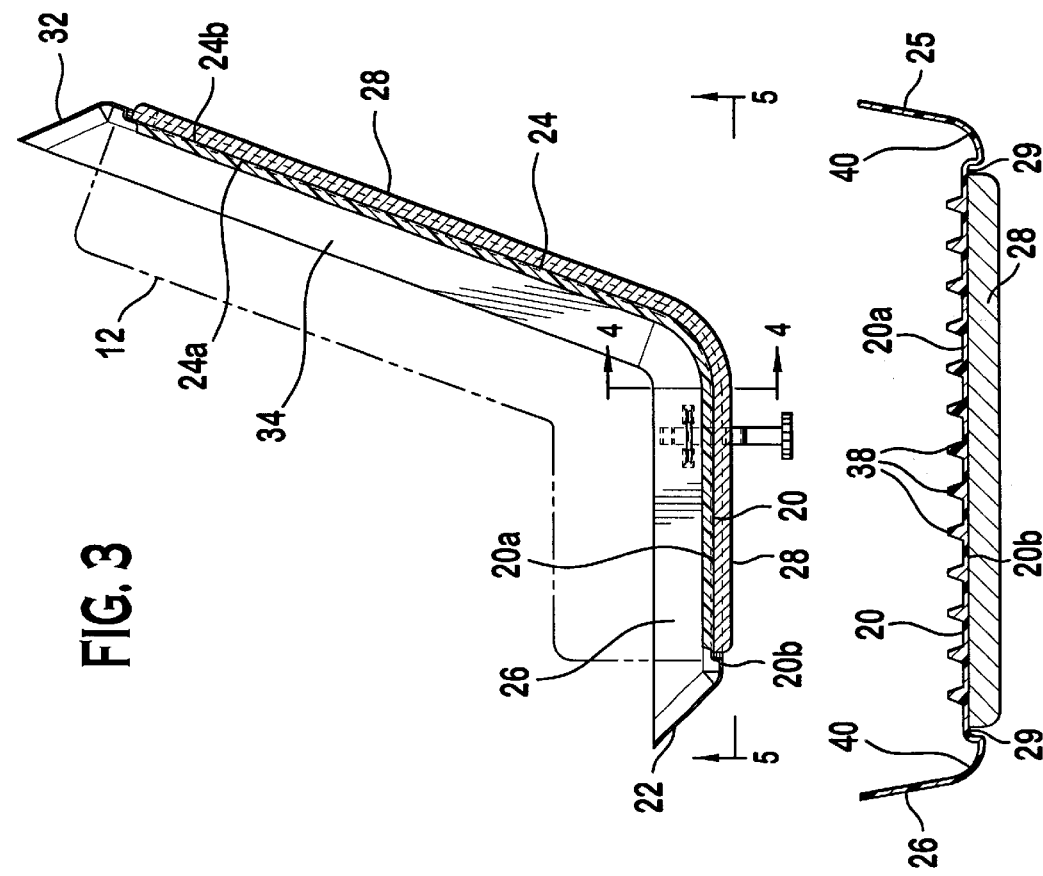
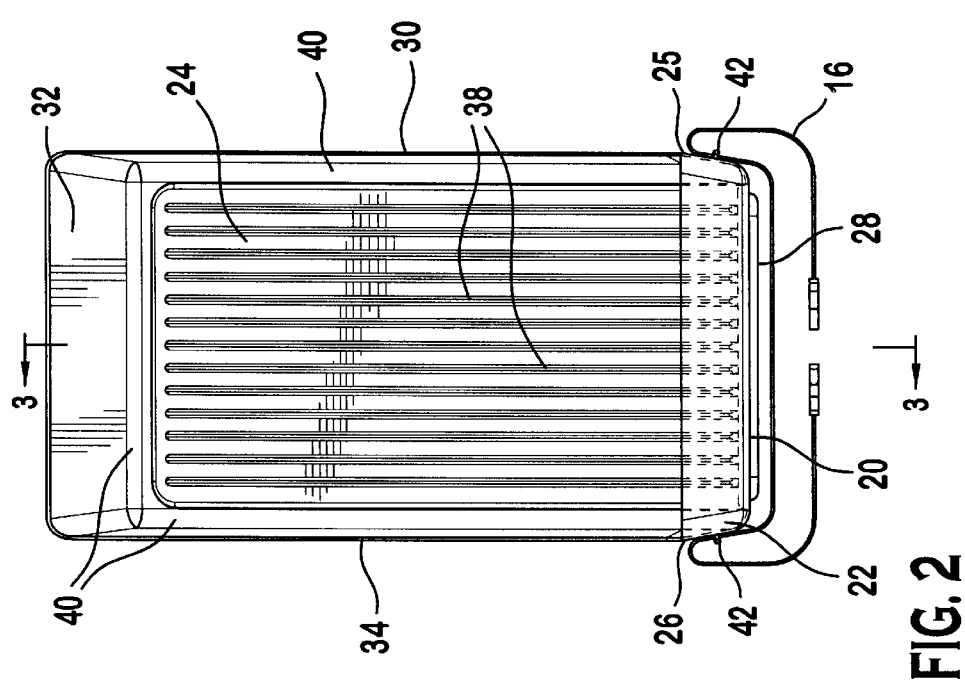

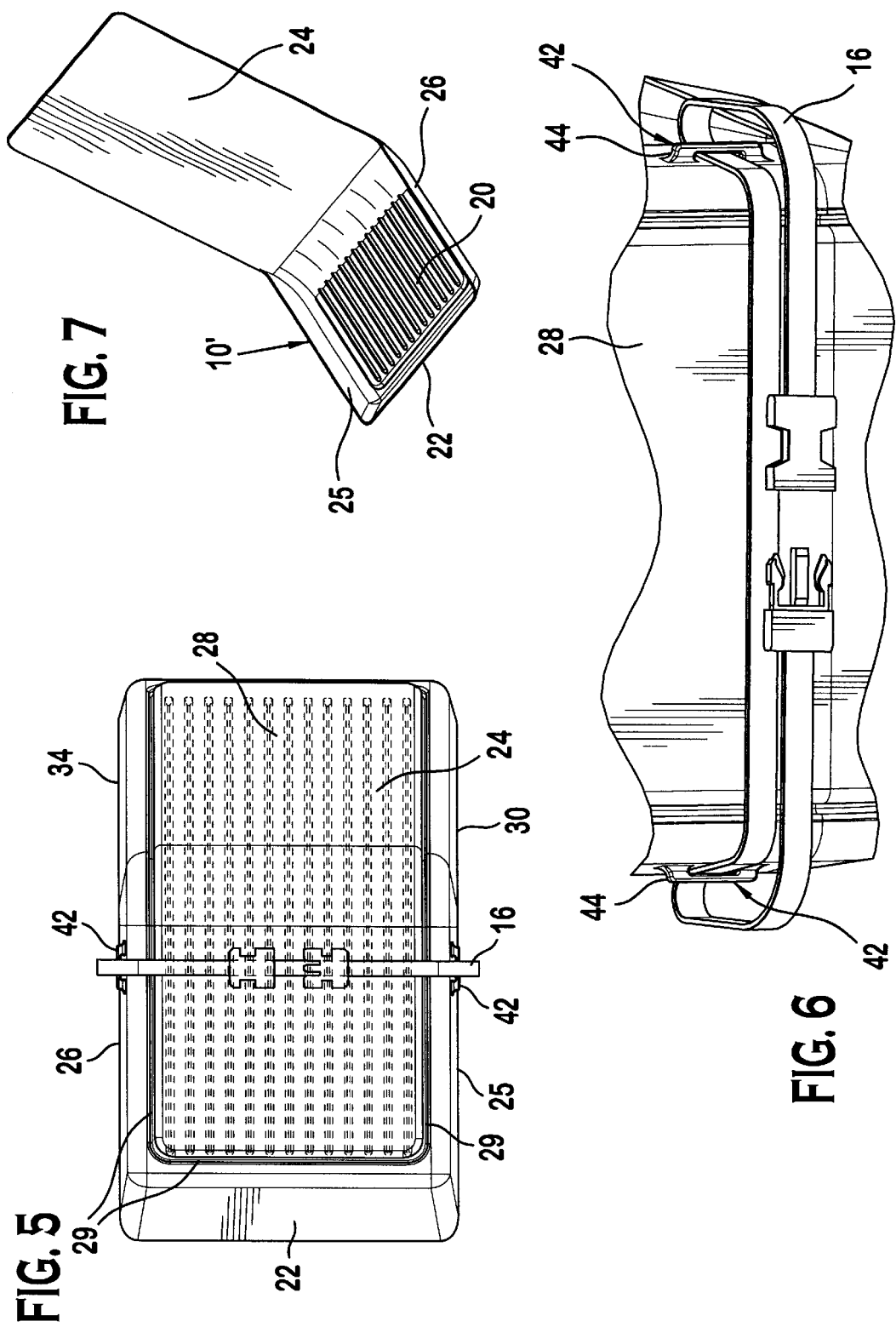

PROTECTIVE CONTAINER FOR MOTOR VEHICLE SEATING

CROSS REFERENCE TO RELATED APPLICATIONS

This application claims the benefit of U.S. Provisional Application No. 60/135,984, filed May 25, 1999, which is incorporated herein by reference as if fully set forth.

BACKGROUND

The present invention is directed to a protective container for motor vehicle seats to protect the seat from damage by an infant or child safety seat (referred to generally as "child safety seat" or "baby seat"). More particularly, the present invention provides a baby seat bucket which can contain spills which is placed between the baby seat and a motor vehicle seat to protect the motor vehicle seat.

Current regulations require use of infant or child safety seats in connection with transporting children in motor vehicles. As used herein, "child safety seat" is intended to refer to any type of infant, baby or child safety seat used in connection with motor vehicles. In use, the child safety seat is strapped in place in a motor vehicle on top of the existing seating. The child is then held in the child safety seat using auxiliary straps, harnesses, bars or other implements provided on the seat. Alternatively, the motor vehicle seat belt is used in conjunction with the child safety seat in order to hold a child in the seat.

Such child safety seats can create damage to the motor vehicle seating due to abrasion at the contact points or through wear and tear from child use, causing damage to the seating material. Infants and children can have accidents in the child safety seat which spills on the motor vehicle seat beneath. It is also possible for children who are eating or drinking to spill liquid or other materials on the seat which penetrates through the strap holes in the seat and contacts the motor vehicle seating below, often causing permanent damage, or at a minimum a time consuming cleanup operation. This can adversely affect the value of a motor vehicle and creates additional unnecessary repair expense.

While it has been known to provide a car seat mat for use with a child restraint seat which is positioned beneath the base of a child restraint seat, this is meant to protect the front portion of the seat below a user's legs from runoff from a child's shoes. The car seat mat includes a flexible, waterproof sheet member having a main portion which extends over the horizontal portion of a car seat upon which the child seat is placed. An intermediate flange extends outwardly from a top surface of the car seat mat and is adapted to support a child's feet. A downwardly extending portion ends in a rigid flange which is adapted to form a pocket to collect and retain water and other liquid from a child's boots. However, the mat lacks side portions and a would allow any material spilled on the child seat to drain around the sides or back of the mat and onto the motor vehicle seating below.

It is also known to provide a safety seat accessory to protect the child occupant from injury during an accident due to flying debris or air bag deployment. The safety seat accessory includes a casing having sides, a back and a bottom and a protective shield pivotally secured to the casing. The child seat is located within the casing. However, the front of the casing is opened or includes gaps at a hinge location and therefore cannot contain liquid spills.

It would be desirable to provide protection for motor vehicle seating which can be used in connection with a child safety seat to prevent damage to the motor vehicle seating.

SUMMARY

Briefly stated, the present invention provides a protective container for motor vehicle seating which is adapted to hold a child safety seat. The protective container includes a bottom panel having upper and lower faces and peripheral edges, as well as front, back and lateral sidewalls extending upwardly from each of the peripheral edges to define an enclosed, liquid-proof space surrounding a child safety seat receiving location on the upper face. The enclosed, liquid-proof space is adapted to contain liquids and other debris to protect at least a horizontal surface of the motor vehicle seating. Padding is located on the lower face of the bottom panel.

In another aspect, the present invention provides a protective container for motor vehicle seating which is adapted to hold a child safety seat. The protective container includes a bottom panel having upper and lower faces and peripheral edges, as well as front, back and lateral sidewalls extending upwardly from the peripheral edges. The back sidewall extends to a height which is greater than the remaining sidewalls. The back sidewall is adapted to support a back portion of a child safety seat, and has front and rear faces and raised sides extending around a periphery thereof that are connected to the lateral sidewalls of the bottom panel. The container provides a liquid-proof space surrounding a child safety seat receiving location on the front face of the back sidewall and the upper face of the bottom panel to provide protection for both generally vertically and horizontally oriented surfaces of the motor vehicle seating.

BRIEF DESCRIPTION OF THE DRAWING(S)

The following detailed description will be better understood when reviewed in conjunction with the appended drawings which illustrate a preferred embodiment of the present invention. In the drawings:

FIG. 2 is a front elevational view of the protective container of FIG. 1.

FIG. 3 is a cross-sectional view taken along lines 3—3 in FIG. 2.

FIG. 4 is a cross-sectional view taken along lines 4—4 in FIG. 3.

FIG. 5 is a bottom view taken along lines 5—5 in FIG. 3.

FIG. 6 is an enlarged perspective view of a portion of the bottom of the protective container for motor vehicle seating which is adapted to hold a child safety seat showing the non-penetrating lashing points.

FIG. 7 is a perspective view of an alternate embodiment of a protective container for motor vehicle seating which is adapted to hold a child safety seat in accordance with the present invention.

DETAILED DESCRIPTION OF THE PREFERRED EMBODIMENTS

Figure 1:
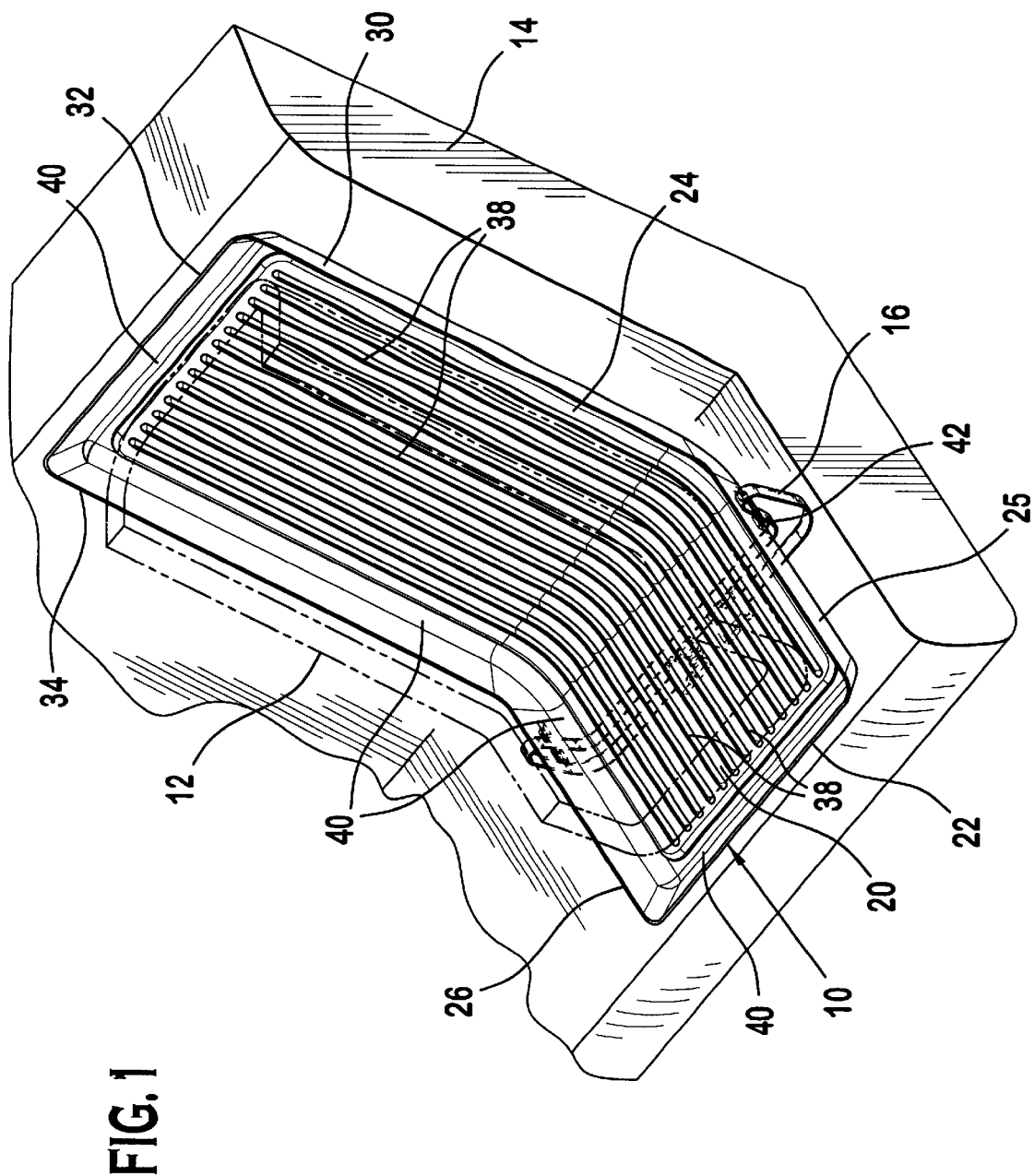
FIG. 1 is a perspective view of the protective container for motor vehicle seating which is adapted to hold a child safety seat in accordance with the present invention, shown in the installed position on a motor vehicle seat.

Certain terminology is used in the following description for convenience only and is non considered limiting. The words "right", "left", "lower" and "upper" designate directions in the drawings to which reference is made. This terminology includes the words specifically noted above, derivatives thereof and words of similar import. Additionally, the terms "a" and "one" are defined as including one or more of the referenced item unless specifically noted. Referring now to FIGS. 1–3, a protective container 10 for motor vehicle seating which is adapted to hold a child safety seat 12 is shown. The protective container 10 is adapted to be installed on a motor vehicle seat 14, as shown in FIG. 1. Preferably, the protective container 10 is attached to the seat via a strap 16, which may extend under or around the motor vehicle seat 14. Alternatively, the protective container 10 may rest on the seat 14 and be held in place only via the means, such as straps or buckles which hold the child safety seat 12 in position. While a strap 16 is preferred, other types of connectors, such as VELCRO® could be utilized, either directly on the container 10, or in combination with straps.

As shown in detail in FIGS. 1–4, the protective container 10 includes a bottom panel 20 having upper and lower faces 20a and 20b. A front sidewall 22, a back sidewall 24 and lateral sidewalls 25 and 26 extend upwardly from the peripheral edges of the bottom panel 20. The sidewalls 22, 24, 25 and 26 are preferably integrally formed with the bottom panel 20 to define an enclosed, liquid-proof space surround a child safety seat receiving location on the upper face 20a which is adapted to contain liquids and other debris to protect a horizontal surface of the motor vehicle seating 14. Preferably, a protective padding 28 is located on the lower face 20b of the bottom panel. The protective padding 28 can be fixed or moveable and is preferably in the form of a foam pad, tufted or plush carpeting or any other suitable padding material which provides some resiliency and cushioning to protect the motor vehicle seat from abrasion damage.

Preferably, the bottom panel 20 and sidewalls 22, 24, 25 and 26 are molded as one piece from a polymeric material, such as PVC, HDPE, synthetic rubber or any other suitable material. However, other suitable materials and construction techniques can be utilized.

Still with reference to FIGS. 1–4, preferably the back sidewall 24 extends to a height which is greater than the remaining sidewalls 22, 25 and 26. The back sidewall 24 is adapted to support a back portion of the child safety seat 12. The back sidewall 24 has a front face 24a and a rear face 24b and raised sides 30, 32 and 34 extending around a periphery thereof. Alternatively, as shown in FIG. 7, the raised sides can be omitted. The raised sides 30 and 34 are connected to the lateral sidewalls 25 and 26 of the bottom panel, respectively, and extend continuously therefrom. Preferably, padding 28 is located on the back sidewall 24 to provide protection for both the vertical and horizontal surfaces of the motor vehicle seating 14. While it is preferred that the back sidewall 24 extends to a height which is adapted to support a back portion of the child safety seat 12, it will be recognized by those skilled in the art from the present disclosure that the back sidewall 14 could extend upwardly only a portion of the full height of the child safety seat back, or that the back sidewall could have approximately the same height of the remaining sidewalls 22, 25 and 26, if desired.

In the preferred embodiment, the bottom panel 20, the sidewalls 22, 24, 25 and 26 and the raised sides 30, 32 and 34 of the protective container 10 are molded as one piece. Preferably, they are molded using a polymeric material. However, it will be recognized by those skilled in the art from the present disclosure that the bottom panel 20, sidewalls 22, 24, 25 and 26 and the raise sides 30, 32 and 34 could be formed as separate pieces and joined together in a separate operation, such as fusing, heat sealing or other means to provide a liquid-tight seam between the bottom panel 20, the front sidewall, back sidewall and lateral sidewalls 22, 24, 25 and 26 and the raised sides 30, 32 and 34.

Referring now to FIG. 4, preferably the padding 28 is partially recessed in recesses 29, at least in the lower face 20b of the bottom panel 20. More preferably, the padding 28 is partially recessed in both the lower face 20b of the bottom panel 20 and the rear face 24b of the back sidewall 24.

As shown in detail in FIGS. 1, 2 and 4, preferably a plurality of ribs 38 are located on the upper face 20a of the bottom panel 20 and the front face 24a of the back sidewall 24 for channeling spilled liquids toward the bottom panel 20. It will be appreciated by those skilled in the art from the present disclosure that the ribs 38 may be provide on both sides of the container 10, if desired, or may be omitted, depending upon the material selection. Additionally, a trough 40 is preferably located around the periphery of the bottom panel 20 in order to allow spilled liquids to collect, as shown in FIG. 4.

As shown in detail in FIG. 6, preferably at least two non-penetrating lashing points 42 are connected to at least one of the sidewalls 22, 24, 25 and 26, the bottom panel 20 and the raised sides 30, 32 and 34 for holding the protective container 10 in position on the motor vehicle seat 14. The non-penetrating lashing points 42 are preferably comprised of C-shaped projections 44 which are fused to or molded onto at least one of the sidewalls 22, 24, 25 and 26, the bottom panel 20 or the raised sides 30, 32 and 34. Preferably, one or more straps 16 may be inserted through the C-shaped projections 44 in order to connect the protective container 10 to the motor vehicle seat 14. However, it will be recognized by those skilled in the art from the present disclosure that other types of lashing points 42 may be provided, so long as any connection to the protective container 10 does not result in openings being defined into the liquid-proof space formed by the bottom panel 20 and the sidewalls 22, 24, 25 and 26 which could allow spilled liquid to penetrate through the protective container 10. For example, sealed fasteners which penetrate through the bottom panel or sidewalls 22, 24, 25 and 26 to attach lashing points to the container 10 could be utilized.

The position of the lashing points 42 may also be varied, and a number of lashing points may be located around the periphery of the protective container 10, if desired. The strap 16 may also use buckles, VELCRO®, or other suitable connectors to assist in holding the protective container in place on the motor vehicle seating 14.

In the preferred embodiment, the bottom panel 20, the sidewalls 22, 24, 25 and 26 and the raised sides 30, 32 and 34 of the container 10 are molded in one piece from a pliable polymeric material to allow the container 10 to conform to the motor vehicle seating. The sidewalls 22, 24, 25 and 26 and the raised sides 30, 32 and 34 may also be formed of a material that is flexible enough to allow the sidewalls 22, 24,25 and 26 and the raised sides 30, 32 and 34 to be folded onto the bottom panel 20 for storage. In this case, the material utilized to form the sidewalls 22, 24, 25 and 26 and the raised sides 30, 32 and 34 must be flexible enough to allow the junctures between the bottom panel, the sidewalls and the raised sides to act as living hinges, such as a synthetic rubber. Preferably, the material also has memory such that, upon unfolding, the protective container 10 resumes its in-use configuration without damage to or cracking of the bottom panel 20, sidewalls 22, 24, 25 and 26, and raised sides 30, 32 and 34.

In use, the protective container 10 in accordance with the present invention is placed in position on the motor vehicle seat 14, and preferably held in position via strap 16 extending through the C-shaped projections 44 and attaching to or extending around the motor vehicle seating. While it is preferred that the strap 16 be utilized to hold the protective container 10 in position, this step may be omitted if no suitable attachment points are provided. Next, the child safety seat 12 is placed in position on the upper face 20a of the bottom panel 20 as shown in FIG. 3. The child safety seat 12 may then be connected to the motor vehicle seat utilizing the existing motor vehicle safety belts or other means, as specified by the child safety seat manufacturer. A child may then be positioned in the child safety seat 12 and restrained utilizing auxiliary straps or other means provided with the child safety seat 12.

In the event of any liquid spill due to an accident, eating, drinking or from the child getting sick, the liquid or other debris is contained in the protective container 10. The entire protective container 10 and child safety seat 12 may then be easily removed for cleaning, preventing damage to the motor vehicle seat 14. The padding 28 also prevents abrasion damage to the motor vehicle seat 14.

Additionally, the protective container 10 may be installed with either the back sidewall or the bottom panel facing downwardly, depending upon the orientation of the infant or child seat 12. Additional variation to the sidewalls 22, 24, 25 and 26 will be apparent to those skilled in the art from the present disclosure, as will the use of various heights and different angles, depending upon the type of child safety seat 12 and motor vehicle seat 14 which the container 10 is adapted for use with. Alternatively, the use of a pliable material for the protective container 10 will allow universal protective containers 10 to be developed.

While the preferred embodiment has been described in the context of a protective container for a child safety seat in a motor vehicle, those skilled in the art will recognize that the protective container 10 could be used in the hospital, home or other places for children, the elderly, non-ambulatory patients, pets, or other similar uses. For example, the protective container 10 could be utilized in connection with an infant or child seat in the home or in other locations, aside from a motor vehicle, in order to contain accidents or spills. For healthcare applications, the material for the container 10 would then, preferably, be sanitary and conform to the applicable health regulations for sanitary usage. The size of the protective container 10 can also be varied to accommodate different uses.

While the preferred embodiments of the invention have been described in detail above, the invention is not limited to the specific embodiments described, which should be considered as merely exemplary. Further modifications and extensions of the present invention may be developed, all such modifications being deemed to be within the scope of the present invention as defined by the appended claims.

What is claimed is:

1. A protective container for motor vehicle seating which is adapted to hold a child safety seat comprising:

a bottom panel having upper and lower faces and peripheral edges, front, back and lateral sidewalls extending upwardly from the peripheral edges to define an enclosed, liquid proof space surrounding a child safety seat receiving location on the upper face which is adapted to contain liquids and other debris to protect a horizontal surface of the motor vehicle seating;

the back sidewall extends to a height which is greater than the remaining sidewalls, the back sidewall being adapted to support a back portion of a child safety seat, the back sidewall having a front and rear faces and raised sides extending around a periphery thereof that are connected to the lateral sidewalls of the bottom panel;

padding located on the lower face of the bottom panel and on the back sidewall to provide protection for both vertical and the horizontal surfaces of the motor vehicle seating; and the upper face of the bottom panel and front face of the back sidewall include a plurality of ribs for channeling spilled liquids.

2. The protective container of claim 1, wherein the bottom panel, sidewalls and raised sides of the protective container are molded as one piece.

3. The protective container of claim 1, wherein the padding is partially recessed in the lower face of the bottom panel and the rear face of the back sidewall.

4. The protective container of claim 1, wherein the back sidewall is located at an obtuse angle to the bottom panel.

5. A protective container for motor vehicle seating which is adapted to hold a child safety seat comprising:

a bottom panel having upper and lower faces and peripheral edges, front, back and lateral sidewalls extending upwardly from the peripheral edges to define an enclosed, liquid proof space surrounding a child safety seat receiving location on the upper face which is adapted to contain liquids and other debris to protect a horizontal surface of the motor vehicle seating;

the back sidewall extends to a height which is greater than the remaining sidewalls, the back sidewall being adapted to support a back portion of a child safety seat, the back sidewall having a front and rear faces and raised sides extending around a periphery thereof that are connected to the lateral sidewalls of the bottom panel; and the bottom panel, sidewalls and raised sides of the container are molded in one piece from a pliable polymeric material to allow the container to conform to the motor vehicle seating.

6. The protective container of claim 5 wherein non-penetrating lashing points are connected to one of the sidewalls, the bottom panel and the raised sides.

7. The protective container of claim 6 further comprising straps connected to the lashing points to secure the protective container to the motor vehicle seat.

8. The container of claim 5, further comprising padding located on the lower face of the bottom panel and padding located on the back sidewall to provide protection for both generally vertical and horizontal surfaces of the motor vehicle seating.

9. The protective container of claim 8, wherein the padding is partially recessed in the lower face of the bottom panel and the rear face of the back sidewall.

10. The protective container of claim 5, wherein the upper face of the bottom panel and front face of the back sidewall include a plurality of ribs for channeling spilled liquids.

11. The protective container of claim 5, wherein non-penetrating lashing points are connected to one of the sidewalls, the bottom panel and the raised sides.

12. A protective container for motor vehicle seating which is adapted to hold a child safety seat comprising:

a bottom panel having upper and lower faces and peripheral edges, front, back and lateral sidewalls extending upwardly from the peripheral edges to define an enclosed, liquid proof space surrounding a child safety seat receiving location on the upper face which is adapted to contain liquids and other debris to protect a horizontal surface of the motor vehicle seating;

the back sidewall extends to a height which is greater than the remaining sidewalls, the back sidewall being adapted to support a back portion of a child safety seat, the back sidewall having a front and rear faces and raised sides extending around a periphery thereof that are connected to the lateral sidewalls of the bottom panel; and the sidewalls and the raised sides are formed of a flexible material to allow the sidewalls and the raised sides to be folded onto the bottom panel.

13. A container for motor vehicle seating which is adapted to hold a child safety seat comprising:

a bottom panel having upper and lower faces and peripheral edges, front, back and lateral sidewalls extending upwardly from the peripheral edges;

the back sidewall extends to a height which is greater than the remaining sidewalls, the back sidewall being adapted to support a back portion of a child safety seat, and includes front and rear faces and raised sides extending around a periphery thereof that are connected to the lateral sidewalls of the bottom panel;

a plurality of ribs located on the upper face of the bottom panel and the front face of the back sidewall for channeling spilled liquids; and the container providing a liquid proof space surrounding a child safety seat receiving location on the front face of the back sidewall and the upper face of the bottom panel to provide protection for both generally vertical and horizontal surfaces of the motor vehicle seating.

14. The container of claim 13 wherein the bottom panel, the sidewalls and the raised sides are molded as one piece form a polymeric material.

15. The container of claim 13 further comprising non-penetrating lashing points located on the bottom panel, the sidewalls and the raised sides.

16. The container of claim 13 further comprising padding located on the lower face of the bottom panel and the rear face of the back sidewall.

* * * * *